Aug. 26, 1930.  J. H. JONES  1,774,379

SEISMOGRAPH AND APPLICABLE TO OTHER MEASURING INSTRUMENTS

Filed Nov. 29, 1929    3 Sheets-Sheet 1

Inventor
J. H. Jones:
by
*(signature)*
Attorney.

Aug. 26, 1930.  J. H. JONES  1,774,379
SEISMOGRAPH AND APPLICABLE TO OTHER MEASURING INSTRUMENTS
Filed Nov. 29, 1929  3 Sheets-Sheet 2

Inventor
J. H. Jones:
by
Attorney.

Inventor
J. H. Jones:
by
Attorney.

Patented Aug. 26, 1930

1,774,379

UNITED STATES PATENT OFFICE

JOHN HUGH JONES, OF HASTINGS, ENGLAND

SEISMOGRAPH AND APPLICABLE TO OTHER MEASURING INSTRUMENTS

Application filed November 29, 1929, Serial No. 410,435, and in Great Britain August 9, 1928.

This invention relates to means for indicating or recording small displacements.

According to the invention the small displacements to be magnified are imparted to a magnetic element, for example, to a thin iron strip of suitable shape, held suspended in a direction transverse to a rapidly distorting magnetic field, that is to say, a magnetic field the value of which changes appreciably from point to point, so that the lines of magnetic force are strongly curved. The arrangement is such that the suspended element will take up a position parallel or nearly parallel to the tangent to the line of force at any particular point, and thus if a small mirror is attached to the suspended element and the suspended element and the source of the field be moved relatively to one another there will be a rotation of the mirror proportional to the displacement of the suspended element, provided this displacement is small. Thus small displacements of the suspended element otherwise indiscernible may be indicated or recorded.

The means described may be employed to record small earth movements imparted to a pendulum or seismograph of either the horizontal or vertical type. It may also be employed in connection with a balance, the mirror magnifying device described being attached to a spring or other kind of balance to record minute changes of loading.

It will be understood that the invention is of broad application as a means for indicating small displacements in the use of a mirror attached to an element so suspended that it may take up a position parallel or nearly parallel to the tangent to the line of force at any particular point, whereby the attached mirror may be rotated on the movement imparted to the suspended element as the result of such small displacements the rotation of the mirror being proportional to the displacements or to the currents to be measured or indicated.

The rapidly varying magnetic field may be produced by means of a permanent or other magnet having the north and south poles brought into proximity to the magnetic element in such manner that at the point where the said element is disposed the lines of magnetic force are strongly curved. It is, however, preferable for the field to be produced by means of two magnets so disposed relatively one to the other that the lines of magnetic force in which the element is disposed are strongly concentrated and the sensitiveness of the instrument is thereby increased. The maximum effect is secured in circumstances where the respective fields produced by the two magnets have the same direction.

The application of the invention is illustrated in the accompanying diagrammatic drawings by way of example.

Figure 1:
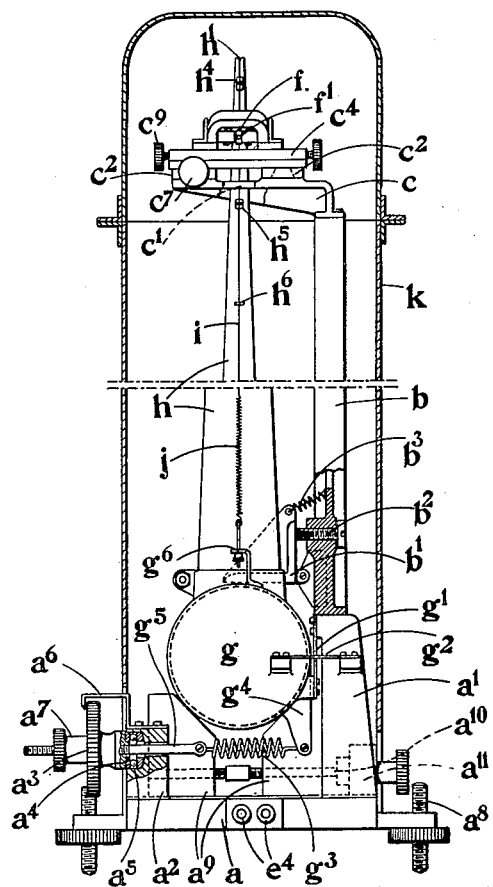
Figure 1 is a view in front elevation of a seismograph provided with a magnetic magnifier according to the invention.
Figure 2:
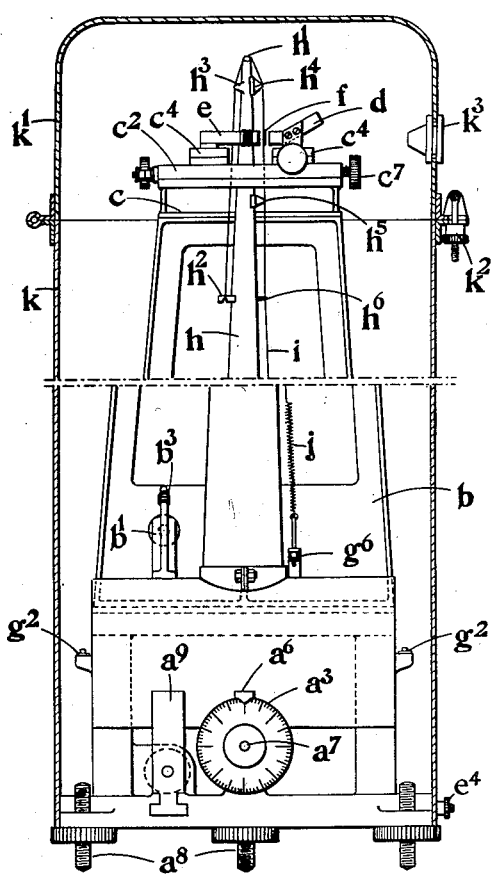
Figure 2 is a side elevation corresponding to Figure 1.

In carrying the invention into effect in its application to a seismograph provided with a construction of the magnetic magnifier as represented in Figures 1 to 5 of the accompanying drawings, a base fitting $a$ is provided to support a standard or pedestal fitting $b$, which in turn supports the base plate $c$ of the magnetic magnifier having a rectangular opening $c^1$ for the passage of the helm or member by which the magnetic element is carried. The base plate $c$ is provided with slideways $c^2$ in parallel disposition on opposite sides of the opening $c^1$ for the reception of slides $c^3$, which in turn serve respectively to carry cross slideways $c^4$ in which are mounted cross slides $c^5$ which respectively support the magnets $d$ and $e$ retained upon the said cross slides by clamping plates $c^6$. The main slides $c^3$ are adapted to be adjusted by adjusting screws $c^7$ which respectively press upon one end of each main slide against the action of a helical spring $c^8$ housed in recesses formed partly in the slides and partly in the ends of the slideways $c^2$. The cross slides $c^5$ are similarly adapted for adjustment of position under control of adjusting screws $c^9$ against the action of springs $c^{10}$. By such a construction the possibility of backlash in the screws is avoided. Similarly, means may be provided to compensate for wear of the holes within which the adjusting screws are disposed comprising fibre pellets such as $c^{11}$ disposed in borings in the ends of the slideways and maintained in contact with the adjusting screws by means of grub screws $c^{12}$.

The magnets $d$ and $e$ are conveniently formed of bar metal and of horse-shoe shape, while the pole pieces $d^1$, $e^1$ formed of strip metal are mounted upon the ends of the magnets to provide a suitable polar gap at a suitable position in relation to the position to be occupied by the magnetic element. For this purpose the pole shoes are advantageously curved outwardly from the ends of the magnets, and in order to permit the width of the polar gap to be adjusted the shoes are advantageously mounted upon the ends of the magnets by means of screws passing through slots disposed in the longitudinal direction of the pole shoes. The latter are, moreover, advantageously flanged at the upper edge so that the flanges may rest upon the ends of the magnets and thus the position of the pole shoes may be maintained notwithstanding the adjustment effected by means of the screws.

The pole shoes $e^1$ of the magnet $e$ are advantageously formed for the reception of coils $e^2$ electrically connected up to the terminals $e^3$ which in turn are connected up to the terminals $e^4$ on the base of the instrument. The coils are wound in the same direction so that a current may be passed through the coils in such manner that a modification of the magnetic field produced by the magnet $e$ is secured, both as regards its intensity and its direction, and so that a distortion of the field may be effected to secure a determined zero position of the magnetic element. The magnet $d$ may similarly be fitted with control coils.

The magnetic element $f$ of the magnifier conveniently comprises a thin iron strip, of a width slightly less than the width of the polar gap, suspended opposite the polar gaps of the pole shoes $d^1$, $e^1$ and between them, and advantageously closer, for example, to the pole shoes $e^1$ than to the pole shoes $d^1$. A minute mirror $f^1$ is mounted upon the element $f$ so as to be positioned opposite the pole gap of the shoes $d^1$ to receive a beam of light reflected directly thereon through the said pole gap. To permit this the rear portion of the magnet $d$ is inclined upwardly out of the path of the beam of light and to form a passage through which such beam may be projected. The manner of adjustment of the slides carrying the magnets hereinbefore described permits of the pole shoes $d^1$ and $e^1$ being adjusted relatively to the magnetic element both in a direction transverse to the element and in a directon parallel therewith, so that any desired disposition of the pole shoes may be secured.

The pole gap of the pole shoes $e^1$ is advantageously filled by means of a mass of copper which conveniently has secured to it thin plates of a material such as mica, celluloid or the like forming flanges which extend laterally over the pole shoe faces, and serve to position the copper mass, while similarly a strip of the material may be secured to the upper surface of the copper mass so as to rest upon the upper edges of the pole shoes, and thus to support the mass. Alternatively, a single strip of the material may be doubled and secured to the two sides of the copper mass for the same purpose. The material facing the pole shoes adjacent the magnetic element serves to prevent adhesion of the magnetic element to the pole shoes in the event of an excessive movement.

The base fitting $a$ is advantageously constructed to support the weight $g$ of the seismograph, and for this purpose is provided with an upstanding portion $a^1$ at the rear, which portion also serves to support the pedestal $b$ and to form the foot thereof. The weight $g$ is provided with a cylindrical case and is carried from the upstanding portion of the base $a$ by means of pairs of spring strip metal, one pair $g^1$ being disposed in the vertical direction and the other pair $g^2$ in the horizontal direction. The strips $g^1$ are secured at their upper ends by screws to projecting faces formed upon the upstanding portion of the base $a$, and at their lower ends to the faces of corresponding lugs provided upon the cylinder or weight $g$. Similarly, the strips $g^2$ are secured at their respective ends to lugs formed respectively at the sides of the upstanding portion of the base $a$ and at the ends of the cylinder or weight $g$. The effective action of the weight $g$ is controlled by means of a helical spring $g^3$ which at one end is attached to a downwardly extending lug $g^4$ provided upon the cylinder or weight $g$, and at the other end is attached to a screw-threaded spindle $g^5$ which passes with clearance through a boring in an upstanding bearing block $a^2$ and is engaged by an adjusting nut or head $a^3$ which advantageously bears by means of a washer $a^4$ upon a ball thrust bearing $a^5$ seated within the bearing block $a^2$. The adjusting nut or head is advantageously graduated and co-operates with an index pointer $a^6$ carried by the bearing block. By the rotation of the said head in the one direction or the other the spindle $g^5$ is advanced or retracted to increase or decrease the tension of the spring $g^3$. A lock nut $a^7$ is provided upon the spindle $g^5$ to maintain the adjusted position of the head $a^6$. In order to permit the base to be effectively levelled, it is conveniently supported by three screwed pins $a^8$ with milled heads, which pins respectively engage corresponding supporting lugs extending laterally from opposite sides of the base.

In order that the weight $g$ may when desired be maintained in a fixed position, as when the instrument is under transport, there are conveniently provided two clamping blocks $a^9$ with chamfered upper faces, which blocks are disposed to slide within a suitable grooved slideway formed in the base $a$ and are adapted to engage the under-surface of the weight $g$ when advanced towards each other by means of a double threaded screw $a^{10}$ which is rotatably carried within an upstanding bearing block $a^{11}$ on the base. In addition the pedestal $b$ has advantageously mounted thereon a pressure member $b^1$ adapted to press downwardly upon the weight $g$ under the action of an adjusting screw $b^2$ mounted in the pedestal $b$. When it is required to free the weight it is necessary only that the screw $b^2$ should be retracted to permit the spring $b^3$ to lift the pressure member $b^1$ from the weight and that the screw $a^{10}$ should be rotated for the separation of the clamping blocks $a^9$.

The weight $g$ serves to support a light conical helm $h$ of thin sheet copper or aluminum, the upper end of which extends through the opening $c^1$ of the base plate of the magnetic magnifier. The head of the helm $h$ is fitted with a cap $h^1$ which is formed with a groove or depression having a semi-circular surface over which may be led the suspending member $i$ for the magnetic element, the said member $i$ being of phosphor-bronze wire or ribbon and being attached to the helm $h$ by means of a transverse pin which engages slots in the lower edge of a U-shaped fitting $h^2$ mounted upon the helm and led upwardly over a bridge fitting $h^3$ over the cap $h^1$, successively over bridge fittings $h^4$ and $h^5$ also provided upon the helm, in engagement with a hook $h^6$, and connected at its lower end to a helical spring $j$ connected in turn to a screw-threaded pin which passes through a hole in a transversely disposed flange of a bracket $g^6$ fitted upon the weight $g$ adjacent the base of the cone or helm $h$. The magnetic element $f$ carrying the mirror $f^1$ is mounted upon the member $i$ at a position between the bridges $h^4$ and $h^5$.

The cone or helm $h$ is conveniently mounted around a circular seating provided upon the weight $g$ to which it may be secured by a split ring engaged by a clamping screw and nut.

An enclosing casing $k$ is advantageously provided to enclose the whole of the instrument, such casing fitting around the base $a$ and being secured thereto by suitable means, as by screws. The upper part of the casing is conveniently provided as a hood $k^1$ hinged to the main body of the casing so that it may be readily thrown back to expose the magnetic magnifier. The two parts of the casing may be provided at the meeting edges with angle metal to add strength and to form suitable contacting surfaces. A suitable fastening $k^2$ may be provided at the opposite side to the hinge connecting the two parts of the casing. The hood $k^1$ is formed with an aperture or window $k^3$ at a suitable position to permit the direction of a beam of light from a suitable source into the casing and against the mirror $f^1$.

It will be understood that in the operation of the instrument, when the magnetic element is moved in the magnetic field as the result of the vibrations of the helm, the element will set itself tangential to the lines of force and in so doing will partially rotate and cause the mirror to deflect a beam of light directed upon it in such manner that the displacement of the element due to the vibration of the helm may be observed or recorded, in any suitable manner, as for example, by the direction of the reflected beam on to a moving sensitive surface.

It will be understood that the vibration may if desired be imparted to the magnetic system rather than to the magnetic element, while, further the manner in which the magnetic system is mounted and adjusted in relation to the element is immaterial to the invention.

Figure 7:
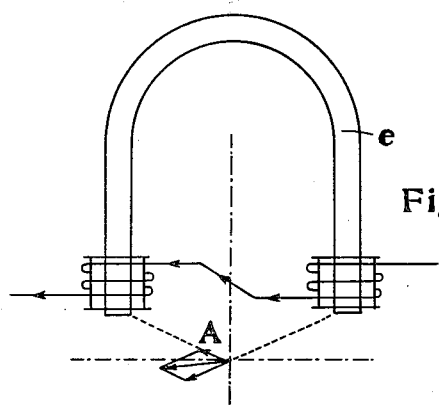
Figures 6 and 7 are diagrams illustrative of the operation of the magnetic magnifier as applied to an oscillograph.
Figure 3:
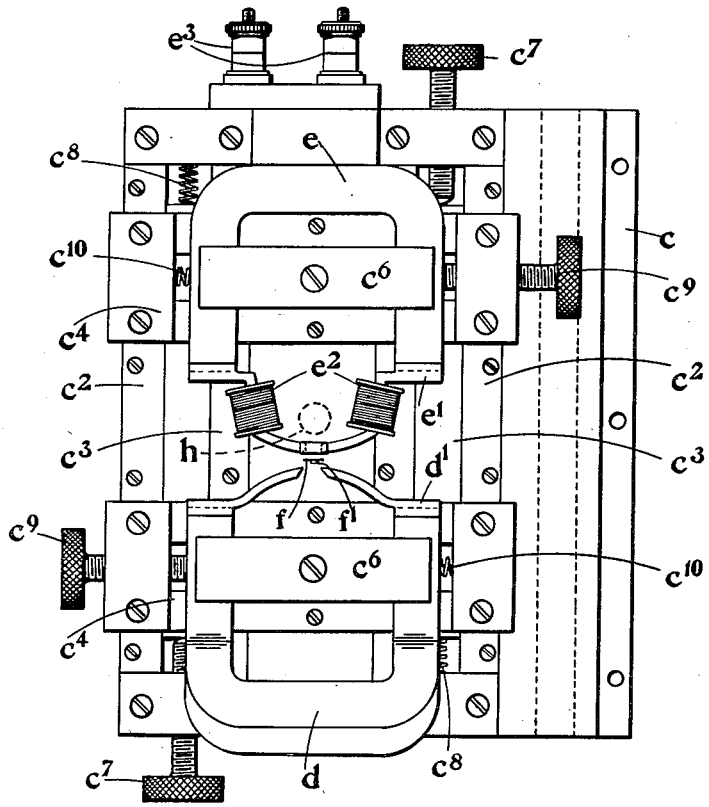
Figure 3 is a plan view of the magnetic magnifier of the seismograph shown in Figures 1 and 2 to an enlarged scale.
Figure 6:
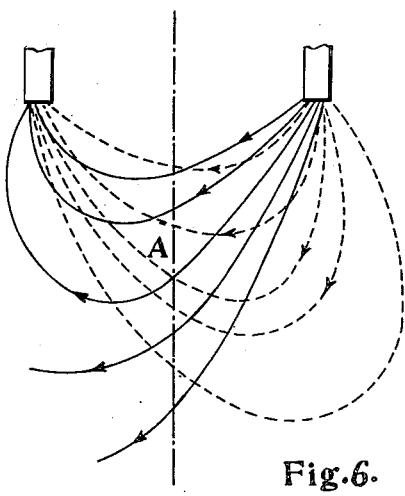
Figure 4:
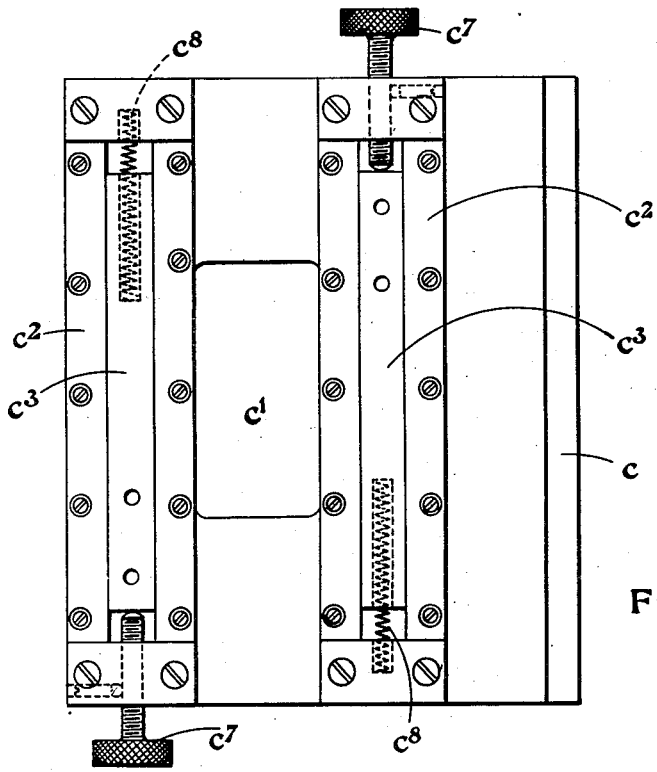
Figure 4 is a detail plan view of the main slides for the adjustment of the magnets of the magnetic magnifier shown in Figures 1 and 2 to an enlarged scale.
Figure 5:
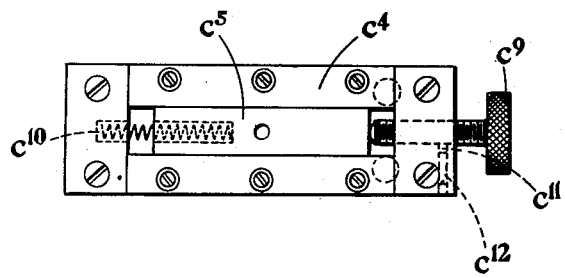
Figure 5 is a plan view of the cross slides supporting the magnets in the said magnetic magnifier also to the enlarged scale.

In the application of the magnetic system, as indicated by the diagrams Figures 6 and 7, a current flowing through the coils weakens one pole and strengthens the other pole. The effect of the current is therefore to distort the magnetic field in the manner that is indicated by full lines in the diagram, Figure 7. Upon the reversal of the current, however, the field is distorted in the manner that is indicated by the broken lines in Figure 6. Thus, considering a point A, as in Figure 7, the magnetic field of the magnet normally is in a direction parallel with the pole pieces. The effect of the weakening of the magnetism of one pole and the strengthening of the magnetism of the other pole causes the resultant field at the point A to be inclined in the direction of the diagonal of the parallelogram of forces there illustrated. On the reversal of the current the diagonal will be inclined on the opposite side of the normal direction of the field. Thus, when the narrow magnetic element is set at the point A in the rapidly distorted magnetic field, it will tend to set itself to follow the periodically changing directions of inclination of the magnetic field with respect to its normal position and will thus oscillate through a corresponding small angle. A mirror attached thereto will therefore reflect a beam of light and record the variations of the current when directed upon a moving sensitive surface.

It will further be understood that the manner in which the magnetic magnifier is applied is capable of variation without departing from the invention, and that it may be utilized in various types of seismographs, oscillographs and other measuring instruments.

I claim:—

1. In a recording seismograph or like recording instrument, a plurality of magnets set in two opposed positions to produce a rapidly varying intense magnetic field having strongly curved lines of force, a magnetic element disposed between the magnets in the said magnetic field so as to take up a position approximately parallel to the tangent to the lines of force at that position, electrical means for rapidly distorting the magnetic field periodically and alternately in opposite directions, a vibratory member from which the magnetic element is freely suspended, the said vibratory element having imparted to it the displacements to be indicated, and a mirror carried by the magnetic element.

2. In a recording seismograph or like recording instrument, two magnets set in opposed positions and serving to produce a rapidly varying intense magnetic field having strongly curved lines of force, one of said magnets being provided with electrical coils for rapidly distorting the magnetic field produced thereby periodically and alternately in opposite directions, a magnetic element freely suspended between the said magnets in the said field to occupy a position approximately parallel to the tangent to the lines of force at the particular position, means for adjusting the magnets relatively one to the other and in relation to the magnetic element, a vibratory member to which the displacements to be indicated are imparted and from which the magnetic element is freely suspended, and a mirror carried by the said magnetic element.

3. In a recording seismograph or like recording instrument, a magnetic system producing a rapidly varying intense magnetic field having strongly curved lines of force, a support in fixed relation to said magnetic system, a weight carried by said support in such manner as to be free to vibrate, a vibratory member extending from the said weight into the said magnetic field, a magnetic element freely suspended upon the said vibratory member in such manner that it may take up a position approximately parallel to the lines of force at the particular position, electrical means for rapidly distorting the magnetic field periodically and alternately at an angle in opposite directions, means for adjusting the effective action of the weight, and a mirror carried by the magnetic element.

4. In a recording seismograph or like recording instrument, a magnetic system producing a rapidly varying intense magnetic field having strongly curved lines of force, a support in fixed relation to said magnetic system, a weight carried by said support in such manner as to be free to vibrate, a vibratory member extending from the said weight into the said magnetic field, a magnetic element freely suspended upon the said vibratory member in such manner that it may take up a position approximately parallel to the lines of force at the particular position, electrical means for rapidly distorting the magnetic field periodically and alternately at an angle in opposite directions, and a mirror carried by the magnetic element.

JOHN HUGH JONES.